United States Patent [19]

Kamisada

[11] Patent Number: 5,060,213
[45] Date of Patent: Oct. 22, 1991

[54] SEPARATION TYPE OPTICAL HEAD

[75] Inventor: Toshimasa Kamisada, Hiratsuka, Japan

[73] Assignee: Hitachi, Ltd., Tokyo, Japan

[21] Appl. No.: 391,195

[22] Filed: Aug. 9, 1989

[30] Foreign Application Priority Data

Aug. 30, 1988 [JP] Japan .................. 63-213565

[51] Int. Cl.⁵ .................. G11B 7/00; G11B 21/00
[52] U.S. Cl. .................. 367/44.21; 369/44.2; 369/43; 369/44.32; 369/112
[58] Field of Search .................. 369/43, 44.32, 44.33, 369/44.34, 44.21, 44.22, 44.12, 44.13, 112; 350/615

[56] References Cited

U.S. PATENT DOCUMENTS

| | | | |
|---|---|---|---|
| 4,782,474 | 11/1988 | Asai et al. | 369/44.32 |
| 4,785,438 | 11/1988 | Mizumoe | 369/44.37 |
| 4,959,824 | 9/1990 | Ueda et al. | 369/112 |

FOREIGN PATENT DOCUMENTS

| | | | |
|---|---|---|---|
| 1196097 | 10/1985 | Canada | 369/44.32 |
| 0189932 | 10/1986 | European Pat. Off. | |
| 2403408 | 6/1974 | Fed. Rep. of Germany | |
| 62-267936 | 10/1987 | Japan | |
| 0200327 | 8/1988 | Japan | 369/44.21 |

Primary Examiner—Roy N. Envall, Jr.
Assistant Examiner—Hung Bui
Attorney, Agent, or Firm—Fay, Sharpe, Beall, Fagan, Minnich & McKee

[57] ABSTRACT

An optical recording/reproducing apparatus for recording and reproducing an information through irradiating a light beam on a recording medium has a separation type construction including a stationary section and a movable section which is movable across recording tracks on the recording medium. The stationary section includes a light source and detectors for detecting data signal and servo control signal from the light beam reflected by the recording medium, while the movable section includes a mirror for reflecting the light beam from the light source to allow the light beam to impinge upon the recording medium perpendicularly thereto, and a lens for converging the light reflected by the mirror onto the recording medium. The mirror and the lens are disposed such that a distance between the mirror and the principal point of the lens is substantially twice as large as the focal length of the lens.

13 Claims, 2 Drawing Sheets

SEPARATION TYPE OPTICAL HEAD

BACKGROUND OF THE INVENTION

The present invention relates to an optical head for use in optical recording/reproducing apparatus such as optical disk equipment and, more particularly, to a separation type optical head having a stationary section such as a light source unit and a movable section such as a lens system, which sections are constructed separately.

A separation type optical head has been known which has a stationary section and a movable section separated from each other, wherein only the movable section moves in the radial direction of a disk across tracks formed on the disk. This type of optical head is disclosed, for example, in Japanese Patent Unexamined Publication No. 62-267936 and also in "Comprehensible Optical Disk" (page 159) published by Opto-Electronics Co., Ltd.

In the known separation type optical head, the stationary section includes components such as a laser diode, a beam splitter and a photo-detector, while the movable section includes components such as a mirror, objective lens and a mechanism for driving such components. Thus, the movable section of the separation type optical disk has a smaller size and weight than the optical head of non-separation type. Therefore, the separation type optical disk offers a reduction in the size of the access mechanism, as well as increased access speed.

On the other hand, the separation type optical head suffers from a problem in that the movable section tends to be tilted in the direction of movement and in the directions transverse to the direction of movement, during the radial movement of the movable section across tracks. Tilting of the movable section, in particular tilting in the direction of movement, causes a relative positional offset of the optical components with the result that the light ray impinging upon the optical disk and the light ray reflected from the optical disk diverge from each other, resulting in an offset of a tracking servo signal. This phenomenon will be referred to as "divergence of light".

More specifically, when there is no tilting of the movable section, the light ray which passes through the optical axis perpendicularly impinges upon the recording surface of a disk and is reflected back along the same path as the incident ray. However, if the movable section is tilted, the light ray impinges upon the disk at an inclination, so that the divergence of light is produced to cause the reflected ray to fail to impinge upon the correct or predetermined portion of the photodetector, thus causing an offset of the tracking servo signal. Such an offset of the tracking servo signal makes it impossible to detect any tracking offset, i.e., any offset of the incident ray from the center of the aimed track. Alternatively, a track error signal is generated even though there is no tracking offset.

SUMMARY OF THE INVENTION

Accordingly, an object of the present invention is to provide a separation type optical head in which divergence of light due to tilting of the movable section is eliminated to reduce any offset of the servo tracking signal.

To this end, according to the present invention, there is provided a separation type optical head in which the distance between the mirror of the movable section and the principal point of an objective lens is set to be about twice as large as the focal length of the objective lens.

DESCRIPTION OF THE PREFERRED EMBODIMENT

Figure 1:
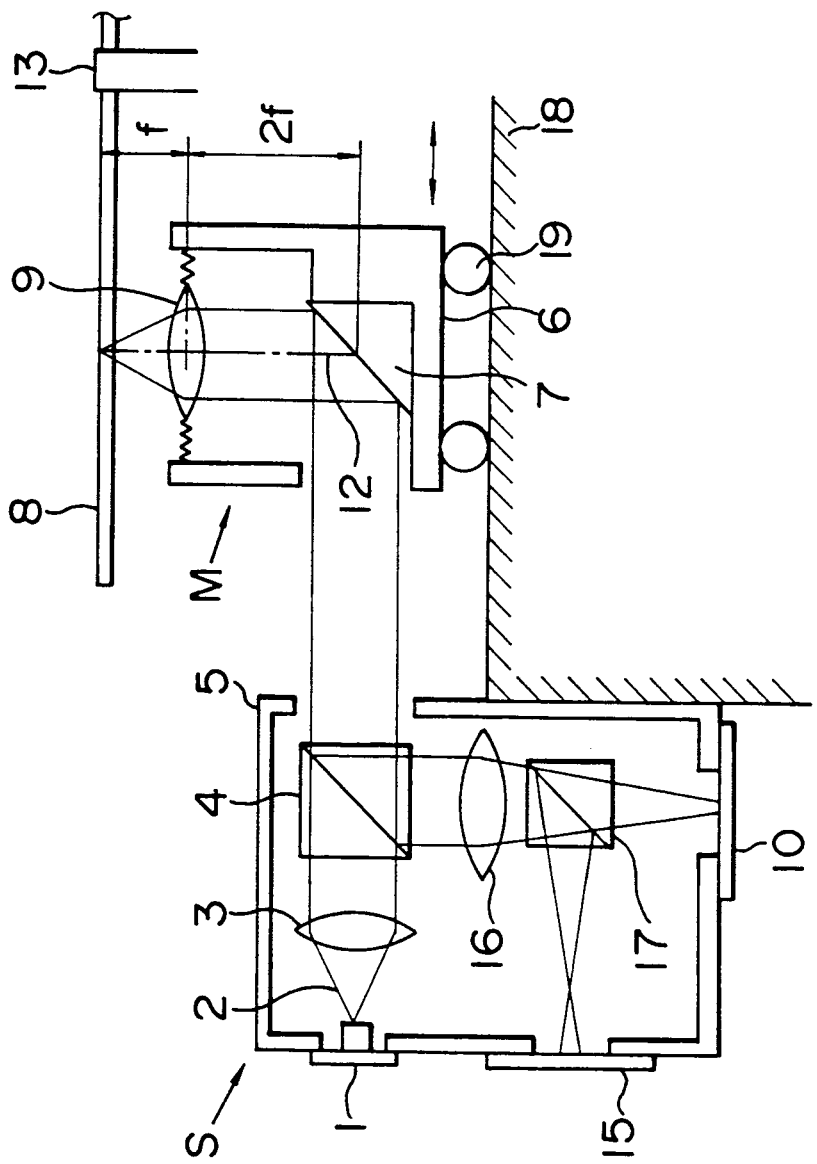
FIG. 1 is a schematic illustration of an optical system of a separation type optical head in accordance with the present invention.

Referring to FIG. 1, there is shown a separation type optical head as an embodiment of the invention, designed for use with optical disk equipment. The optical head has a stationary section S and a movable section M. The stationary section S has a stationary casing 5 fixed to the frame 18 of the optical disk equipment, and various components secured to the stationary casing 5 and including a semiconductor laser 1 serving as a light source unit, a first collimator lens 3, a first beam splitter 4, a second collimator lens 16, a second beam splitter 17 and a pair of photodetectors 10 and 15. The movable section M has a movable casing 6 which is movable relative to said frame 18, and a mirror 7 and an objective lens 9 which are secured to the movable casing 6. The distance between the mirror 7 and the principal point of the objective lens 9 in the movable section M is set to be twice as large the focal length f of the objective lens 9. Thus, the distance between the mirror 7 and the principal point of the objective lens 9 is represented by $2f$. The objective lens 9 is so set that the distance between the principal point of the lens 9 and the recording surface of the optical disk 8 corresponds to the focal distance f of this lens 9.

Although not shown, a voice coil motor is provided on each side of the movable casing 6. The movable casing 6 is adapted to be driven by the voice coil motors so as to move in the radial direction of the optical disk 9, through the action of a bearing 19, so as to be positioned on a desired track on the optical disk.

In operation, the movable casing 6 is driven by the voice coil motors so as to be positioned with respect to the desired track on the optical disk 8. A light ray 2 emitted from a laser diode 1 is changed into a parallel light beam through the collimator lens 3 and the first beam splitter 4 and emanates from the stationary casing 5 so as to impinge upon the movable casing 6. The light ray 2 is orthogonally deflected by the mirror 7 fixed to the movable casing 6 and is converged by the objective lens 9 orthogonally to the optical disk 8. The light ray 2 reflected by the optical disk 8 again passes through the objective lens 9 and is orthogonally reflected by the mirror 7 and further orthogonally reflected by the first beam splitter 4, so as to impinge upon the first and second photodetectors 10 and 15 through the second collimator lens 16 and the second beam splitter 17, whereby data signal and servo signal are independently detected by the photodetectors 10 and 15.

In recording desired information, the light ray 2 emitted from the semiconductor laser 1 is modulated in accordance with the data signal representing the information to be recorded and the thus modulated light ray is applied to the optical disk 8. Meanwhile, a tracking control is conducted in accordance with a tracking servo signal derived from one of the photodetectors 10 and 15. For reproducing the recorded information, a light ray 2 of a power level lower than that of the recording light ray is applied to the optical disk 8 and the light reflected and the reflected light ray reflected along the optical path is received by the photodetectors 10 and 15 so that the data signal representing the reproduced information and the servo signal are derived independently from these photodetectors 10 and 15.

Figure 2:
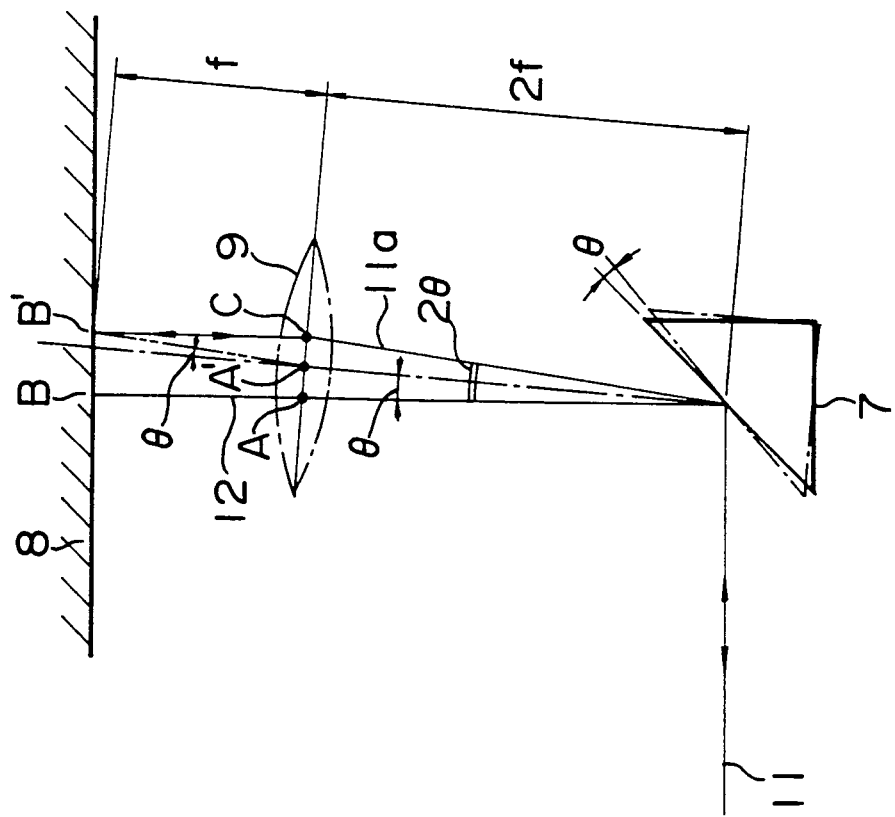
FIG. 2 is a schematic illustration of an optical system of the movable section of the embodiment shown in FIG. 1, illustrative of the operation of the optical system.

Referring now to FIG. 2, when the movable casing 6 is not tilted in the radial direction of the optical disk 8, the mirror 7 is located at the position shown by solid lines. In this case, the light ray 11 vertically impinges upon the optical disk 8 past the principal point A of the objective lens 9 along the optical axis 12. The light ray reflected by the optical disk 8 at a position B returns along the same path as the path of the incident light ray. Assuming here that the movable casing 6 is tilted at a small angle $\theta$, the mirror 7 and the objective lens 9 move to the positions shown by dashed lines, while the principal point A of the objective lens 9 is moved from the position A to another position A'. In this case, the light ray 11 is reflected by the mirror 7 so as to become a light ray 11a which impinges upon a point B' on the optical disk 8 through a point C on the objective lens 9.

Letting $2f$ represent the distance between the mirror 7 and the principal point A of the objective lens 9, the following conditions exist in this state.

$$\overline{AC} \approx 2f \cdot 2 = 4f\theta \quad (1)$$

$$\overline{BB'} \approx (2f+f)\cdot\theta + f\theta = 4f\theta \quad (2)$$

Therefore, $$\overline{AC} = \overline{BB'}$$

Thus, the line $\overline{CB'}$ is parallel to the optical axis 12.

Since the light ray 11a impinges upon the optical disk 8 vertically thereto along the line $\overline{CB'}$, the light reflected by the optical disk 8 returns along the same path as the incident light ray, thus eliminating any divergence of light between the incident light ray and the reflected light ray.

As a result of the slight tilting of the movable casing 6, the point at which the light ray impinges upon the optical disk 8 is offset from the position B to another position B'. This offset, however, does not cause any problem because it is compensated for by the tracking servo control. More specifically, the offset of the optical axis to the point B' is detected by the photodetector 10 or 15 and the voice coil motors are operated in accordance with the result of detection of the offset so as to move the movable section M so as to enable the optical axis of the incident light ray to be aligned with the desired position B of the desired track.

As has been described, in the separation type optical head of the present invention, the distance between the mirror and the objective lens in the movable section is set to be twice as large as the focal length of the objective lens, so that the light ray reflected by the recording medium, e.g., an optical disk, traces back the same path as the incident light ray despite any tilting of the movable section. Thus, the invention prevents occurrence of any divergence of light between the incident light ray and the reflected light ray which inevitably takes place when the movable section is tilted in known separation type optical heads. It is therefore possible to eliminate generation of offset a tracking servo signal attributable to tilting of the movable section of a separation type optical head.

What is claimed is:

1. An optical recording/reproducing apparatus for recording or reproducing information by irradiating a light beam onto an optical recording medium, said apparatus comprising:

a stationary section comprising a light source adapted to emit a light beam toward the optical recording medium, and a detector adapted to output a data signal and a servo signal responsive to said light beam after it has been reflected by said recording medium;

a movable section including a mirror adapted to reflect the light beam from said light source to irradiate said recording medium and to cause the resulting reflected light beam to reflect from said recording medium; and means for moving said movable section in a direction parallel to the surface of said recording medium; said mirror and said lens being disposed such that a distance between said mirror and the principal point of said lens is substantially twice as large as the focal length of said lens.

2. An optical recording/reproducing apparatus according to claim 1, wherein said recording medium is an optical disk on which are defined a plurality of recording tracks, and said means for moving said movable section is arranged to move said movable section in a radial direction of said optical disk.

3. An optical disk equipment for recording and reproducing an information by irradiating a light beam onto an optical disk on which are defined a plurality of recording tracks, comprising:

a first section including a light source for emitting said light beam, and a detector for detecting at least a tracking control signal derived from the reflected light beam after the reflected light beam has been reflected by said optical disk;

a second section including a mirror for first reflecting said light beam from said light source toward said optical disk, and a lens for converging said first-reflected light beam onto said optical disk orthogonally thereto, said light beam being thereby reflected from said optical disk toward said mirror, wherein said mirror is arranged to reflect said light beam toward said detector, said mirror being disposed such that the point of reflection of said light beam from said mirror is located at a position spaced from said optical disk by a distance which is substantially three times as large as the focal length of said lens; and voice coil motor means for causing movement of said second section relative to said first section in the radial direction of said optical disk.

4. An optical recording/reproducing apparatus according to claim 3, wherein said second section further comprises means including said detector for detecting an offset of said light beam from a desired recording track, wherein said voice coil motor means moves said second section in accordance with the result of the detection so as to move said second section thereby to direct said light beam to said desired track.

5. An optical head for an optical recording/reproducing apparatus of the type including an optical recording medium and a light source for illuminating the recording medium with a light beam, said optical head comprising:

a mirror means having a principal point and reflecting the light beam to change its direction of propagation; and a lens means having a principal point and converging the reflected light beam to a focal point of the lens means;

wherein said mirror means is positioned so that its principal point of reflection of the light beam is located a distance from the principal point of said lens means substantially equal to two times the focal length of said lens means.

6. An optical recording/reproducing apparatus, comprising:

light source means for emitting a light beam;

mirror means having a principal point reflecting the light beam to change its direction of propagation toward a recording plane to produce a reflected light beam; ;and converging lens means having a focal point located in the recording plane for converging the reflected light beam to the focal point for irradiating the recording plane;

wherein said mirror means is positioned so that the principal point of reflection of the light beam therefrom is located a distance form the focal point equal to substantially three times the focal length of the lens means.

7. An optical recording/reproducing apparatus as claimed in claim 6, further comprising a movable casing to which said mirror means and said lens means are commonly mounted.

8. An optical recording/reproducing apparatus as claimed in claim 7, wherein said mirror means is mounted to be stationary with respect to said movable casing.

9. In an optical recording/reproducing apparatus of the type including a mirror means for reflecting an incident light beam through a converging lens means of focal length f for subsequent impingement on a recording plane, said mirror means and said leans means each having a principal point, the improvement comprising:

the principal point of said lens means being located a distance f from said recording plane, and said mirror means being positioned so that its principal point is located a distance equal to 3f from the recording plane.

10. The improved optical recording/reproducing apparatus of claim 9, further comprising a movable casing to which said lens means and said mirror means are commonly mounted.

11. In an optical recording/reproducing system including a mirror means having a principal point for reflecting an incident light beam propagating along an incident propagation path, the light beam being reflected from the mirror means through a converging lens means of focal length f for subsequent impingement on a recording medium, said converging lens having a principal point, wherein the light beam is directed to said recording medium to record/read information on said recording medium, said system determining that the light beam is on track when it reflects from said recording medium through said lens to said mirror means and reflects from the principal point of the mirror means along the incident propagation path, said system determining that said light beam is mistracking when it falls to reflect along the incident propagation path due to tilting of said mirror means and said lens means with respect to said recording medium, the improvement comprising:

the principal point of said lens means being positioned a distance f from said recording medium, and said mirror means being positioned so that its principal point is located a distance substantially equal to 3f from the recording medium, wherein the light beam reflecting from the mirror means after reflecting from the recording medium substantially propagates along the incident path without adjustment of the mirror means/lens means tilting with respect to the recording medium.

12. The improved optical recording/reproducing system claimed in claim 11, further comprising movable casing means to which said mirror means and said lens means are commonly mounted.

13. The improved optical recording/reproducing apparatus claimed in claim 11, further comprising voice coil motor means for moving said movable casing along a plane parallel to the plane of said recording medium.

* * * * *